United States Patent [19]

Barlow

[11] 3,789,204

[45] Jan. 29, 1974

[54] SELF-CHECKING DIGITAL STORAGE SYSTEM

[75] Inventor: George Joseph Barlow, Tewksbury, Mass.

[73] Assignee: Honeywell Information Systems Inc., Waltham, Mass.

[22] Filed: June 6, 1972

[21] Appl. No.: 260,154

[52] U.S. Cl. ................ 235/153 AM, 340/146.1 AG, 340/174 ED

[51] Int. Cl. ..................... G06f 11/10, G11c 29/00

[58] Field of Search...235/153 AM, 340/146.1 AG, 340/174 ED, 340/174 TC

[56] References Cited

UNITED STATES PATENTS 3,585,378 6/1971 Bouricius .................... 235/153 AM 3,599,146 8/1971 Weisbecker ................ 235/153 AM

*Primary Examiner*—Charles E. Atkinson
*Attorney, Agent, or Firm*—Nicholas Prasinos et al.

[57] ABSTRACT

A self-checking digital storage system and method for detecting faults within the storage system. An address word for a memory location into which information is to be written is combined with a data word that is contained in that address location and one combined parity bit is generated for the combined words and placed into memory. When the information is accessed, the address information is subtracted from the data information to indicate correct data information if the data parity corresponds to the original data parity.

16 Claims, 3 Drawing Figures

SELF-CHECKING DIGITAL STORAGE SYSTEM

BACKGROUND OF THE INVENTION

1. Field of the Invention

This invention relates generally to self-checking digital storage systems, and more particularly to self-checking solid state arrays.

2. Description of the Prior Art

Digital systems utilize a host of different types of memory and storage devices, including core memories, thin film memories, semi-conductor memories, read-only memories (ROM's), and others. In Chapter 5 of a book entitled, "Micro-Programming: Principles and Practices," by Samir S. Husson, published in 1970 by Prentice-Hall, there is a description of many of these different types of memories. Most commonly used memory systems in a digital computer system are word-addressed memories, which includes among others core memories, read-only memories (ROM's), content addressable memories (CAM's), random access memories (RAM's), and others. Some of the major components of the word addressable memory are as follows:

a. An array of memory elements which may be magnetic cores, solid state elements, or other two-state devices;
b. Decoders for decoding the address of a memory location;
c. Drivers for writing and/or reading information into a memory location;
d. Sense amplifiers for amplifying information signals read out of memory;
e. Control logic;
f. Wires;
g. Connectors;
h. Load resistors, etc.

With such a plurality and complexity of components in a memory system, it is inevitable that faults will arise in one or more of these components resulting in erroneous information being written into and/or read from a memory system. However, no natural symptoms, such as hum or distortion as evidenced in a radio receiver when a component fails, is exhibited by the computer when a component fails in a computer memory system; nevertheless, a wrong answer is provided when such failure occurs. It is essential, therefore, that some means for detecting errors be provided for a computer memory system. Ideally, such an error detecting system for a computer memory system should detect the following:

a. that data is correctly written into memory and contains no errors;
b. that data is correctly read out of memory and has no errors;
c. that data addressed is the data retrieved;
d. and that malfunctions in the memory apparatus are recognized.

Many error detecting schemes have been devised, some of which are described in a book entitled, "Error Detecting Logic for Digital Computers," by Frederick F. Sellers, Jr., Mu Yue Hsiao, and Leroy W. Darnson, published in 1968 by McGraw-Hill Book Company. Briefly, some prior art schemes entail the principle of redundance, (parallel operation and/or multiple processes). One technique in using the redundance principle is to process the problem twice and compare the results. However, this technique proved to be slow and not altogether reliable, since a component failure could distort both solutions in the same manner. In parallel operation and/or multiple process or error detection, information is fed in parallel to identical circuitry and the solution compared; moreover, by providing exclusive-OR circuits between the parallel paths at critical points, errors may be detected before the problem is solved, since the exclusive -OR circuit will produce an output only when its two inputs are different; hence, if the parallel inputs are similar, no errors will be indicated. Such techniques, however, are costly; therefore, error detecting codes have been utilized to overcome this problem wherein the principle of redundancy is to use more information than is needed, but not necessarily twice as much. Such codes as the two out of seven, or two out of five codes evolved. In these codes every word has two 1 bits, with a different number indicating an error. There have been developed many other error detecting and error correcting codes too numerous to mention. Perhaps the most popular error detecting codes that have survived are the odd or even parity codes. In the odd parity codes, a parity bit, 0 or 1 is generated and appended to a word to make the total number of 1 bits odd. For the even parity code, the total number of 1 bits in a word is even. If the number of 1 bits in a word when the information is retrieved is not an odd number for odd parity checking, there is an error. Similar reasoning applies to even parity checking.

The parity checking scheme was generally applied to data words stored in a memory location, and this scheme works well with core memories where the most often occurring failure appears to be a short circuit in the array that results in wrong information, no information, or information from two locations to be retrieved from core memories; these faults, in general, provide a parity error. However, as memories evolved toward solid state memories with their fragile wires and interconnections, a different type of failure became as predominant as the above-named failures, and possible more predominant. In this new type of frequently occurring failure, data containing no errors was retrieved, but from a location not addressed, i.e., a wrong location. To solve this problem the entire address of the memory location could be stored in memory along with the data, and each time that the data is read out of the memory location, a comparison of the address obtained with the address that called for the information could ascertain whether or not the location actually accessed was the one actually addressed. As can be readily observed, this technique may require a memory for storing the address word alone that could be as large as the memory for storing the data word, and therefore results in a more expensive computer. A more reasonable technique, and one sometimes utilized in prior art machines, is to generate an address parity bit and a data parity bit and store both in two dedicated bit-positions along with the data word. When the data is read out of memory, a new parity bit is generated and compared with the stored address parity bit to determine whether the address desired was the address actually read out. This technique, although more efficient than the prior technique, is still wasteful of memory in that it requires an additional dedicated memory bit position for the address parity. Moreover, commercially readily available solid state memory chips provide for only one parity bit location, and not two; to redesign a special solid state memory chip for use in limited quantities for few types of machines or for use in the computer machines of only one manufacturer would be costly and could place that manufacturer at a competitive disadvantage in the marketplace. What is needed, therefore, is an economical technique and/or apparatus which utilizes only one dedicated bit position for parity that will enable memory faults to be detected, whether they occur in the address or the data.

OBJECTS

It is an object of the invention, therefore, to provide an improved method and apparatus for detecting memory faults.

It is another object of the invention to provide a relatively low-cost, reliable apparatus for detecting memory faults.

It is still another object of the invention to provide an improved method and apparatus that detects errors arising from erroneous data and/or addresses.

Other objects and advantages of the invention will become apparent from the following description of a preferred embodiment of the invention when read in conjunction with the drawings contained herewith.

SUMMARY OF THE INVENTION

An odd parity is generated for an address of a given location, and an odd parity is generated for the data within the address location (even parity may also be generated as well). The parity of the data is combined with the parity of the address in an exclusive-OR half-adder circuit, and the resulting parity bit i.e., combined bit—is written into memory. When information is accessed, the parity of the address is effectively subtracted from the parity of the data in a second exclusive-OR circuit yielding the data parity accessed. A check of the data parity accessed with the original data parity detects possible faults in the memory which could result in erroneous data or erroneous address.

DESCRIPTION OF A PREFERRED EMBODIMENT OF THE INVENTION

Figure 1:
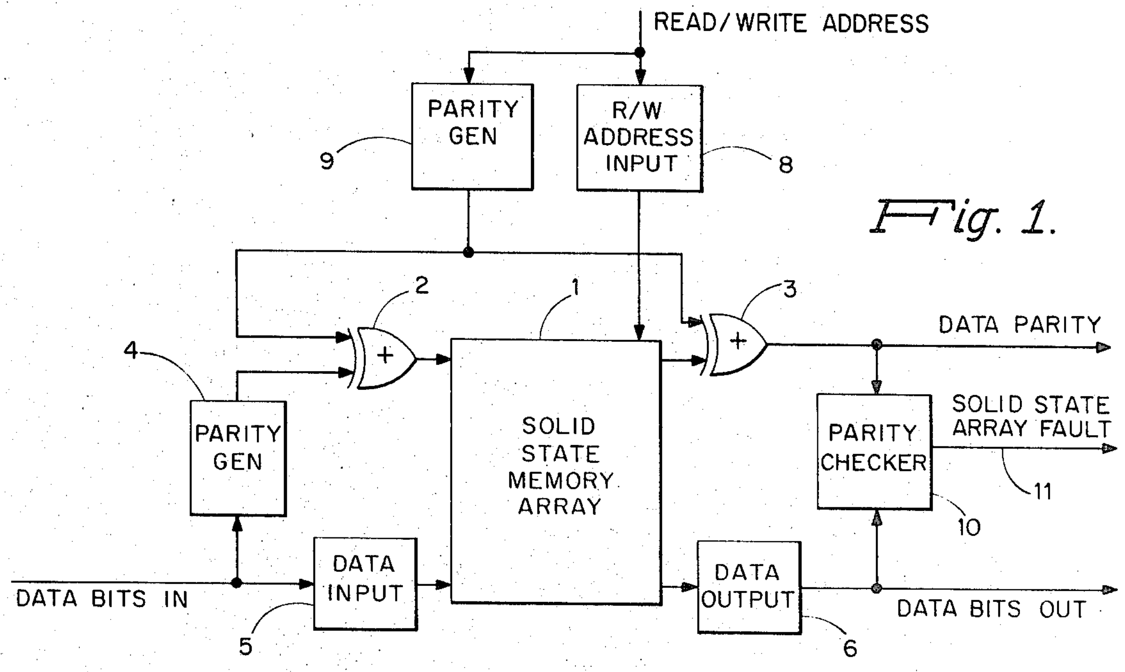
FIG. 1 is a block diagram of the invention.

Referring now to FIG. 1, a solid state memory array 1 having 256 locations comprised of 8 bit words to each location may be a HROM 8256 type manufactured by Harris Semiconductor, a Division of Harris-Intertype Corporation (other equivalent type memory chips with more or less addressable locations may be used and may be a ROM, a RAM, or a CAM type memory). To address each location of the HROM 8256 memory, a word comprised of eight binary bits is required. A decoder (not shown in FIG. 1) utilizes an eight bit binary word to address any of 256 locations of the solid state array. Data information is applied to the memory 1 through data input means indicated by box 5; whereas data information is abstracted from the memory 1 through data output means indicated by box 6. The data input and output means may be parallel or serial as desired, and is conventional. An odd parity generator 4, which may typically be a Texas Instrument Type Ser. No. 74,180 (although equivalent types of other manufacturers may be used) generates an odd parity bit for the data and is applied to the input terminal of exclusive-OR gate 2. An address parity generator 9, which also may be a Type Ser. No. 74,180, generates an odd parity for the address where the data is to be located, and this odd parity is applied to another input terminal of exclusive-OR gate 2. These signals are half-added (exclusive-OR'ed) by exclusive-OR circuit 2, and the resulting parity bit signal (i.e., combined bit signal) is stored in a dedicated bit location of the 8 bit data word of the address location. The address of the word to be written or read out of memory into or out of a particular location is applied to a decoder (not shown) via a read-write address input means indicated by box 8. When the address is decoded to indicate a particular location in memory 1, conventional switching logic is set to write the data and the resulting parity bit (combined bit) into that location or to read the data and the resulting parity bit out of that particular location, depending on whether the memory is a ROM or a RAM and also on the instruction, micro-instruction, or micro-op then being executed. When data and the resulting parity bit stored in a memory is being read out of memory, the data is abstracted through data output means 6, whereas the parity bit is applied to one input of an exclusive-OR gate 3. An address odd parity bit is generated by address parity generator 9 and is applied to another input terminal of exclusive-OR circuit 3, which in this case acts as a half subtractor yielding the original odd parity of the data. (The truth table for a half adder or half subtractor is the same.) The number of 1 bits in the data is then checked against the data parity bit, and if the result is an odd number of 1 bits, then there is an indication that the correct data has been read out.

A data parity checker 10, which may typically be a Texas Instrument Type Ser. No. 74,180 is used to verify that the correct data has been read out. If the output signal represented by arrow 11 is low or logical 0 then the data is without error. If the output signal represented by arrow 11 is high or logical 1 then the data contains an error.

The following truth tables I and II for exclusive-OR circuits 2 and 3 respectively bear this reasoning out.

TABLE I

| | $P_2$ bit 0 | 1 |
|---|---|---|
| $P_1$ bit | | |
| 0 | 0 | 1 |
| 1 | 1 | 0 |

TABLE II

| | R bit (Comb.) 0 | 1 |
|---|---|---|
| $P_1$ bit (Gen.) | | |
| 0 | 0 | 1 |
| 1 | 1 | 0 |

Table I illustrates the truth table for the input exclusive-OR circuit 2; with $P_1$ and $P_2$ bits representing the parity bits of the address and data respectively that may be possible input signals to exclusive-OR gate 2. The resulting parity bit (combined bit) is stored in memory 1 and is shown on Table I as the truth table of possible outputs of exclusive-OR gate 2 resulting from the possible input signals or exclusive-OR gate 2. Likewise Table II is the truth table for output exclusive-OR circuit 3; the R bit i.e., the combined bit from memory 1 is one input signal of exclusive-OR circuit 3; the $P_1$ bit is a generated address bit and is a second input signal of exclusive-OR gate 3. The truth table II is the possible output signals of exclusive-OR gate 3 and represents the possible data parity bit signal that would result under the possible input conditions represented by the $P_1$ and $R_1$ input signals. The convention used is that a high signal is represented by 1, whereas a low signal is represented by 0. It is noted from tables I and II that unlike signals on the inputs of an exclusive-OR circuit produces a high signal 1, and like signals produce no output signal, i.e., low or 0. If for example, the input address parity bit is 1 and the input data parity bit is also 1, a 0 resultant parity (combined) signal is generated by exclusive-OR gate 2 and stored in memory 1. When accessing data from that address a parity bit, in this case, 1 is generated for that address and applied as one input signal to exclusive-OR gate 3; also the resultant parity bit (combined bit) is accessed from memory—in this case 0 for correct data—and applied as a second input signal to exclusive-OR gate 3. The possible outputs of exclusive-OR gate 3 is shown in Table II and in this case is 1. Comparing this parity bit 1, representing data parity, with the original data parity bit $P_2$, they are similar i.e., 1 and indicate correct address and correct data. On the other hand if wrong data is accessed and the combined parity bit accessed with it is 1, then by referencing Table II it is seen that two 1 inputs result in a 0 output; comparing the 0 output of the exclusive-OR circuit 3 representing the original data parity bit to the actual original data parity bit, in this case 1, gives no match indicating an error in the data or address. Similarly all conditions may be verified.

An example would further clarify how errors may be detected or the correctness of data and address verified with this invention. Assuming we have a data word that has all 0 bits totaling seven 0's; hence, the parity bit for this data word would be 1, which is odd parity and makes up the eighth bit of the word. Assuming this data word of seven 0's is to be placed in address location 0, i.e., the address has eight 0's; the address parity generated is a 1. When the two parities 1 and 1 are half-added in exclusive-OR circuit 2, the resultant out is a logical 0 or low signal, since an exclusive-OR circuit would yield a logical 1, or high signal, only when the two inputs are different. When the data from this 0 location is read out through data output means 6, the combined parity bit, in this particular instance logical 0, is applied to one input terminal of exclusive-OR circuit 3; address parity generator 9 generates an address parity, which in this case is logical 1 because the address is at the 0 location, and having no 1's an odd parity is 1 for this address; this data parity is also applied to an input terminal of exclusive-OR gate 3, which performs a half-subtraction. Since a logical 1 and a logical 0 or a high and a low signal are applied to the inputs of exclusive-OR circuit 3, it will deliver a logical 1 or high signal. When the number of 1's in the data is compared to the parity bit on the output terminal of exclusive-OR circuit 3, it will be noted that the total number of 1's is odd, thus indicating that the correct data with no errors was obtained.

Assuming now that the same data is located in the same memory location but there is a failure in the address portion of the memory array. All 0's will have been written into the all 0 location; however, when this location is readdressed to read data out, some fault in the solid state array indicates a different location than the all 0's correct location. Assuming, for ease of illustration, that data is accessed out of address location 00000100, or the fifth memory location (because 00000000 is the first memory location) and that the data in that location is 0000011, or decimal 3. When this wrong data is read out, it has a combined parity bit of 1 as its eighth bit in order to maintain an odd parity for the word, and this parity bit of 1, or a high signal, is applied to one input of exclusive-OR gate 3. The location addressed was still 0, and the address parity generator 9 will generate an odd parity for this address, which is a logical " 1"; this logical 1 address parity bit, or high signal, is applied to another terminal of exclusive-OR circuit 3. Exclusive-OR circuit 3 by half-subtraction produces a 0 at its output. However, the original data had a 1 as its data parity; hence comparison shows an obvious error either in the address or the data. This comparison is carried out by a comparator 10 which is typically a parity generator of the type previously described, and its operation is described in greater detail infra.

Figure 2:
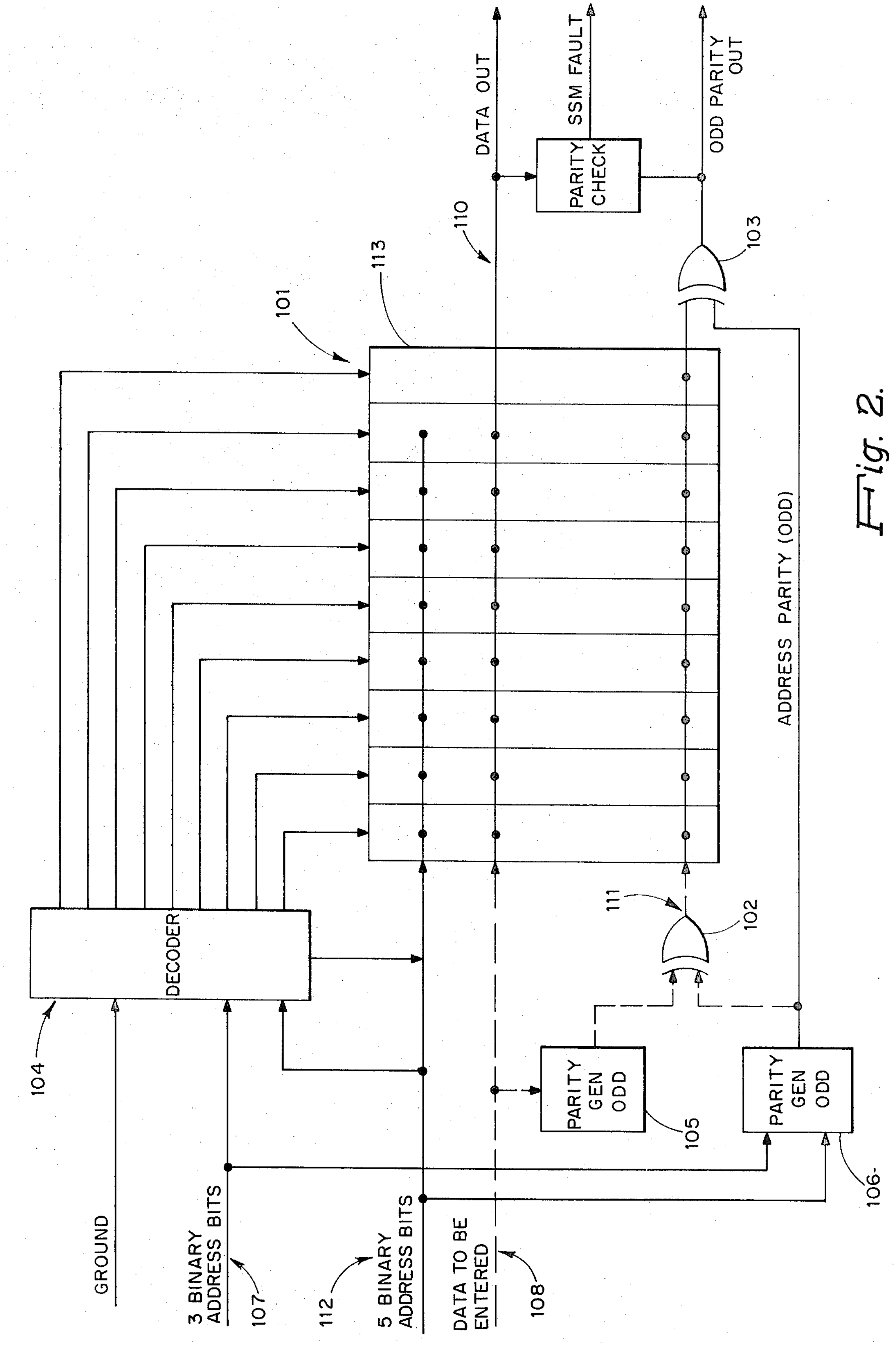
FIG. 2 is a more detailed logic block diagram of the invention.

Referring now to FIG. 2, a more detailed logic block diagram utilizing a ROM memory 101 is shown. The ROM memory 101 is programmed at the factory of the computer manufacturer to incorporate therein data, micro-instructions, and/or micro-operations. Data and/or instructions including a parity bit as developed by the instant invention are read into appropriate locations in the memory. A decoder 104 which may typically be a Ser. No. 7,442 type manufactured by Texas Instrument Incorporated (equivalent decoders of other manufacturers may be utilized) decodes a binary address of 3 bits presented to the decoder input lines 107. The decoded address indicates the location where data presented to the seven input data lines 108 and the odd parity bit generated by the instant invention is to be placed. When all the information is entered into the ROM, the information is made permanent in accordance to techniques well known in the art. (See step-by-step instructions on programming HROM-8256 semiconductor memory issued by manufacturer Harris-Semiconductor Corp. 1971 as a technique which is typical.) The input data lines 108 and the input parity line 111 are shown on FIG. 2 as dot-dash lines to indicate that information is entered into the memory once by the manufacturer, and the memory cannot be altered by the programmer although other type memories which may be readily altered may be used. The ROM 101 is comprised of rows of eight semi-conductor chips of the HROM-8256 type manufactured by Harris-Semiconductor Corp., a division of the Harris Intertype Corporation (although equivalent semiconductor chips of other manufacturers may be utilized). There are 32 locations and each location of each chip comprises an 8 bit word. Any one of the eight columns of semiconductor chips comprising the ROM 101 may be selected by applying a binary address 000 through 111 to the input terminals A, B, C, of decoder 104. (The uppermost address lead is grounded since it is not required in this eight address scheme.) To select any one of 32 words of one chip of ROM 101 the five address bits applied to input terminal 112 of solid state array 101 by a 5 bit decoder and drive a selection line high are decoded (See FIG. 3); the appropriate chip is selected as described supra. Hence, an eight bit binary address word can be decoded to uniquely locate one out of 256 ($8 \times 32$) locations within the solid state array. As previously noted, data is inserted into selected locations in memory via the input data lines 108. The parity bit is generated as previously described by half-adding in an exclusive-OR circuit 102 the data odd parity bit generated by data parity generator 105, with the address odd parity bit generated by address parity generator 106. As was previously stated, this information is read into memory 101 and is made permanent by techniques known to the art.

With the information tus made permanent into the ROM 101, data is accessed by placing an address word in an address register (not shown) which is then decoded in the decoder 104, to give the location of the information desired. Data is read out of ROM 101 via data readout lines 110 and stored in a ROM data register (not shown).

Data and parity signals which are read out of the solid state array are developed across termination resistors (113) located in a DP501 type integrated circuit (which may typically be of the type manufactured by Film Microelectronics Inc., Burlington, Mass., and labelled A-105. The parity bit stored in a preassigned location of the selected word is also read out of memory along with the data and placed on one input terminal of exclusive-OR gate 103. Moreover, an address parity is generated by parity address generator 106 and placed on another input terminal of exclusive-OR gate 103. Exclusive-OR'ing the two inputs on exclusive-OR gate 103 results in an odd data parity. The odd data parity bit from exclusive-OR gate 103 and the data out on output lines 110, are then applied to the input of an odd parity checker (which may typically be T. I. Ser. No. 74,180 which as has been previously seen to be an odd parity generator). The output of the odd parity checker when high (logical one) indicates a memory fault. If the output is low (logical zero) then data is without error.

Figure 3:
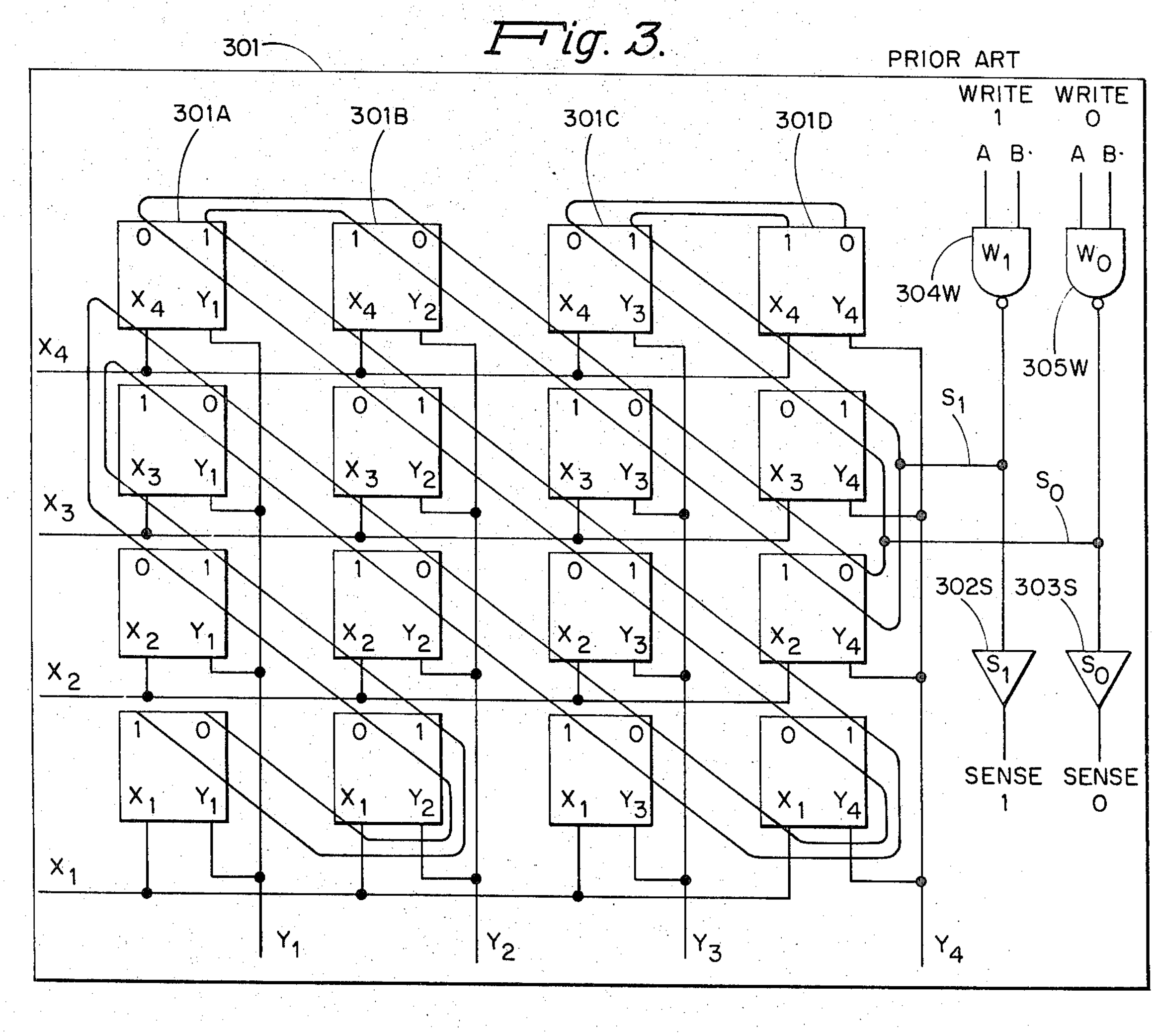
FIG. 3 is a schematic diagram of a prior art solid state memory that may be utilized in the invention.

Referring now to FIG. 3, there is shown a typical prior art semiconductor memory chip 301 comprised of flip-flops arranged in an array having four flip-flops to a column with four columns, 301A, 301B, 301C, and 301D, to the array. This arrangement makes a 4 × 4 matrix with each flip-flop representing one bit. X address lines X1, X2, X3, X4, and Y address lines Y1, Y2, Y3, Y4, permit the address of any one bit at any given time. Although not shown on FIG. 3, each flip-flop is comprised of two cross-coupled 3-emitter transistors. By knowing which one of the two transistors is conducting, it can be determined whether a logical 1 or a logical 0 has been stored in the flip-flop. In order to do this, one emitter of each of the two transistors of each flip-flop functions aS a sensing output terminal. All of the 16 logical b 1 sensing output terminals are coupled to the logical 1 sensing amplifier 302S via sense line $S_1$, whereas all 16 of the logical 0 sensing output terminals are coupled to logical 0 sensing amplifier 303S via logical 0 sensing line $S_0$. The two remaining emitters of each transistor are utilized to couple to the X and Y address lines respectively for proper addressing. To read out information from any location, the X and Y address lines of that particular location, are taken to a logical 1 voltage. The desired location is where the activated X and Y address lines cross, and at this point the current in the transistor of the flip-flop which is conducting diverts from the address lines to the appropriate sense line and then to the appropriate sense amplifier 302S or 303S, depending on which one of the transistors was conducting; therefore, an indication of a logical 1 or a logical 0 can be sensed. This information as it is sensed, depending on the application, can be applied to a ROM storage register for further use.

To write information into any given location, the proper location is selected at the intersection of an activated X address line and an activated Y address line and then a logical 1 voltage is applied to the appropriate write gate 304W or 305W via sense wire $S_1$ or $S_0$, depending on whether a logical 1 or a logical 0 is desired to be written. Write gates 304W and 305W are NAND gates; hence, when a high voltage is applied to its input terminals, a low voltage results at its output terminal, and that output voltage is applied to all the sense terminals to which that output is connected via its respective sense line. Hence all flip-flops with the exception of the one being addressed will be low. With the selected flip-flop, however, if the flip-flop is already in the desired state, no change will occur. However, if the flip-flop is not in the desired state, then the low voltage applied to the emitter of the transistor which is not conducting turns that transistor on, causing the other transistor to turn off. The circuit described is a Texas Instrument Ser. No. 7,484 type and is typical of a prior art 16 bit active element monolithic memory which can be used in combination to fabricate larger memories.

Having shown and described one embodiment of the invention, those skilled in the art will realize that many variations and modifications can be made to produce the described invention and still be within the spirit and scope of the claimed invention.

What is claimed is:

1. A self-checking digital storage system comprising:

a. a memory array;

b. half-adder and half-subtractor circuit means coupled to said memory array;

c. data parity generating means, coupled to said half-adder circuit means, for generating a data parity bit indicative of the parity of data to be stored in a selected location of said digital storage system;

d. address parity generating means, coupled to said half-adder and half-subtractor circuit means, for generating a first address parity bit indicative of the parity of an address where the data is to be stored or retrieved;

e. parity checking means, coupled to said memory array and to said half-subtractor means, for comparing the data parity applied or retrieved to or from said address location of said memory, with the data parity subtracted from an actually accessed location of said memory;

f. data input means, coupled to said memory array and to said data parity generating means, for applying data signals to said memory array; and g. data output means, coupled to said memory array and to said parity checking means, for abstracting data signals from said memory array;

whereby said half-adder circuit means half-adds the data parity bit and the first address parity bit to produce a combined parity bit for storing in the addressed location within said memory array and whereby said half-subtractor circuit means half-subtracts from a memory-accessed combined parity bit a second generated address parity bit indicative of the parity of the address of the addressed location, said combined parity bit indicative of the parity of the data and address in the accessed location.

2. A self-checking digital storage system as recited in claim 1 wherein said parity checking means comprises a parity generator.

3. A self-checking digital storage system as recited in claim 1 wherein said half-adder and half-subtractor circuit means comprise exclusive-OR circuitry.

4. A self-checking digital storage system as recited in claim 1 wherein said memory array is a solid state memory array.

5. A self-checking digital storage system as recited in claim 1 including decoding means coupled to said memory array for decoding the selected address location of said memory array.

6. A self-checking digital storage system as recited in claim 1 wherein said memory array is a core memory array.

7. A self-checking digital storage system as recited in claim 1 wherein said memory array is a read only memory (ROM).

8. A self-checking digital storage system as recited in claim 1 wherein said memory array is a random access memory (RAM).

9. A self-checking digital storage system as recited in claim 1 wherein said memory array is a content addressable memory (CAM).

10. A method of checking a digital storage system comprising the steps of:

a. generating a data parity bit indicative of the parity of the data to be stored in said digital storage system;
b. generating a first address parity bit indicative of the parity of the address where the data is to be stored;
c. half-adding the data parity bit and the address parity bit to produce a combined parity bit;
d. storing the combined parity bit and the data in a selected location addressed by the address;
e. accessing the combined parity bit along with the data whenever the data is readout of said digital storage system;
f. generating a second address parity bit for the address uitlized to effect the readout of the data and the combined parity bit;
g. half-subtracting the second address parity bit from the combined parity to produce a reconstructed parity bit; and,
h. comparing the reconstructed parity with a parity bit of the data output.

11. The method as recited in claim 10 including the further step of comparing the reconstructed parity bit to the parity bit of the word stored in the memory array.

12. A method of checking a digital storage system comprising the steps of:

a. combining two words to obtain a combined bit indicative of the parity of each of the two words;
b. storing said combined bit in a location of the digital storage system together with one of the two words;
c. accessing said combined bit together with said one of two words when the location containing said combined bit and one word is addressed by the other word;
d. reconstructing the parity bit of the one word from the combined bit and the parity bit of the other word;
e. and comparing the reconstructed parity bit to the original parity bit of the one word.

13. A self-checking digital storage system comprising, combining means, coupled to said digital storage system, for combining the parity bit of one word with the parity bit of another word to obtain a combined bit, reconstructing means, coupled to said combining means and to said digital storage system, for reconstructing the parity bit of the one word from the combined bit and a generated bit of said another word, and comparing means, coupled to said reconstructing means and to said digital storage system, for comparing the reconstructed parity bit to the parity bit of the one word.

14. A self-checking digital storage system as recited in claim 13 wherein said combined bit is stored in said digital storage system.

15. A self-checking digital storage system as recited in claim 14 wherein the one word is a data word and the other word is an address word indicating a storage location in said digital storage system where said combined bit is to be stored.

16. A self-checking digital storage system comprising:

a. a memory array;
b. half-adder and half-subtractor circuit means, the output of said half-adder and at least one input of said half-subtractor coupled to said memory array for storing or retrieving information in or out of said memory array;
c. data parity generating means coupled to said half-adder circuit means for generating a data parity bit indicative of the parity of data to be stored in a selected location of said memory array;
d. address parity generating means, coupled to said half-adder and half-subtractor circuit means, for generating a first address parity bit indicative of the parity of an address where the data is to be stored or retrieved; whereby said half-adder circuit means half-adds the data parity bit and the first address parity bit for storing in the addressed location within said memory array, and whereby said half-subractor circuit means half-subtracts from a memory-accessed combined parity bit a second generated address parity bit indicative of the parity of the address of the addressed location to produce reconstructed parity bit, said combined parity bit indicative of the parity of the data and address in the accessed location; and,
e. comparator means, coupled to said half-subtractor and to said memory array, for comparing the reconstructed parity bit with the parity bit of the data output.

* * * * *